(12) United States Patent
Ishigaki

(10) Patent No.: US 9,656,563 B2
(45) Date of Patent: May 23, 2017

(54) MODULAR WIRELESS ELECTRICAL SYSTEM

(71) Applicant: Toyota Motor Engineering & Manufacturing North America, Inc., Erlanger, KY (US)

(72) Inventor: Masanori Ishigaki, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 344 days.

(21) Appl. No.: 14/447,753

(22) Filed: Jul. 31, 2014

(65) Prior Publication Data

US 2016/0031330 A1 Feb. 4, 2016

(51) Int. Cl.
| | | |
|---|---|---|
| *B60L 11/18* | (2006.01) | |
| *H02J 7/02* | (2016.01) | |
| *H02J 5/00* | (2016.01) | |

(52) U.S. Cl.
CPC ......... *B60L 11/182* (2013.01); *B60L 11/1831* (2013.01); *B60L 11/1861* (2013.01); *B60L 11/1864* (2013.01); *H02J 5/005* (2013.01); *H02J 7/025* (2013.01); *Y02T 10/7016* (2013.01); *Y02T 10/7044* (2013.01); *Y02T 10/7061* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(58) Field of Classification Search
CPC ......... B60L 11/182; H02J 5/005; H02J 7/025; H02J 7/00; H01F 38/14; H01F 38/00
USPC .......................................................... 307/104
See application file for complete search history.

(56) References Cited

U.S. PATENT DOCUMENTS

| | | | | |
|---|---|---|---|---|
| 5,365,160 A | * | 11/1994 | Leppo | H02J 7/0081 320/160 |
| 5,796,175 A | | 8/1998 | Itoh et al. | |
| 2008/0116847 A1 | * | 5/2008 | Loke | H02J 7/025 320/108 |
| 2010/0109445 A1 | * | 5/2010 | Kurs | B60L 11/007 307/104 |

(Continued)

FOREIGN PATENT DOCUMENTS

CN 103269114 A 8/2013

OTHER PUBLICATIONS

U.S. Appl. No. 14/670,138, filed Mar. 26, 2015, Ishigaki, et al.

*Primary Examiner* — Jared Fureman
*Assistant Examiner* — Win Htun
(74) *Attorney, Agent, or Firm* — Oblon, McClelland, Maier & Neustadt, L.L.P.

(57) ABSTRACT

A wireless modular power transfer system includes electric power modules and RF converter circuitry within the electric power modules that meets voltage and power characteristics of the electric power modules. Sensor data is processed to determine a wireless power transfer path. An electric power module is established as a power source by aligning RF converter circuitry as a transmitter, and an electromagnetic field is established as a wireless power transfer area. An electric power module is established as an electric load by aligning RF converter circuitry as a receiver. Power transfer between the electric power modules is controlled through the wireless power transfer area.

20 Claims, 10 Drawing Sheets

(56) References Cited

U.S. PATENT DOCUMENTS

| | | | |
|---|---|---|---|
| 2010/0201320 A1* | 8/2010 | Coe | H01M 10/44 320/129 |
| 2011/0254377 A1* | 10/2011 | Wildmer | B60L 11/182 307/104 |
| 2012/0104997 A1* | 5/2012 | Carobolante | H04B 5/0037 320/108 |
| 2012/0119698 A1* | 5/2012 | Karalis | B60L 11/182 320/108 |
| 2012/0248890 A1* | 10/2012 | Fukushima | H02J 5/005 307/104 |
| 2014/0055096 A1 | 2/2014 | Lee | |
| 2014/0183942 A1* | 7/2014 | Sugiyama | B60L 11/123 307/10.1 |

* cited by examiner

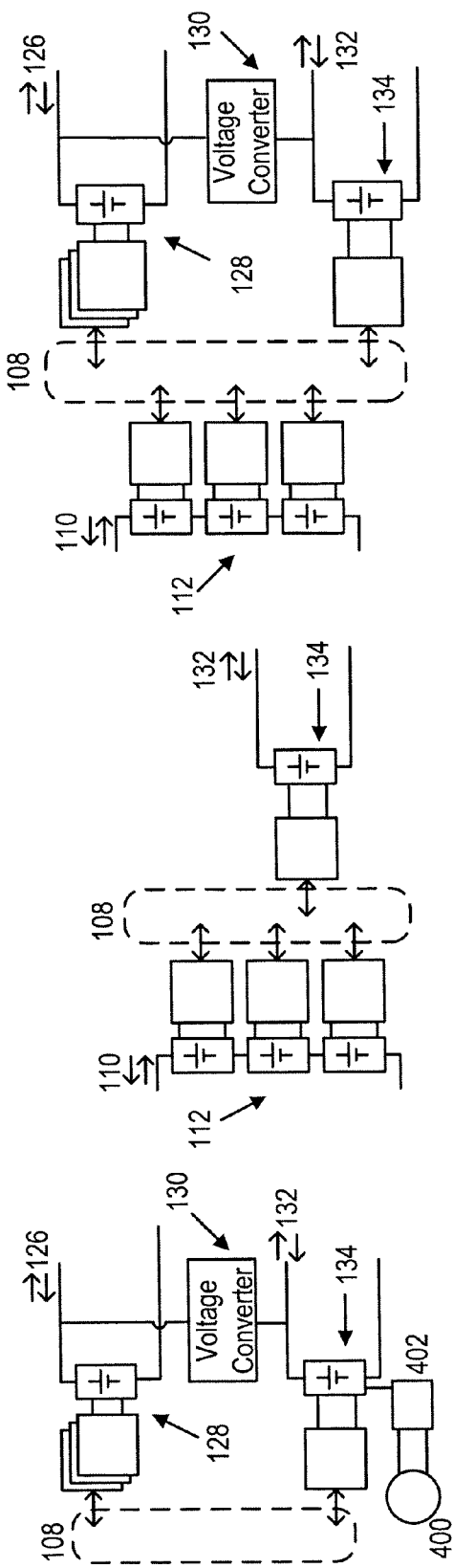

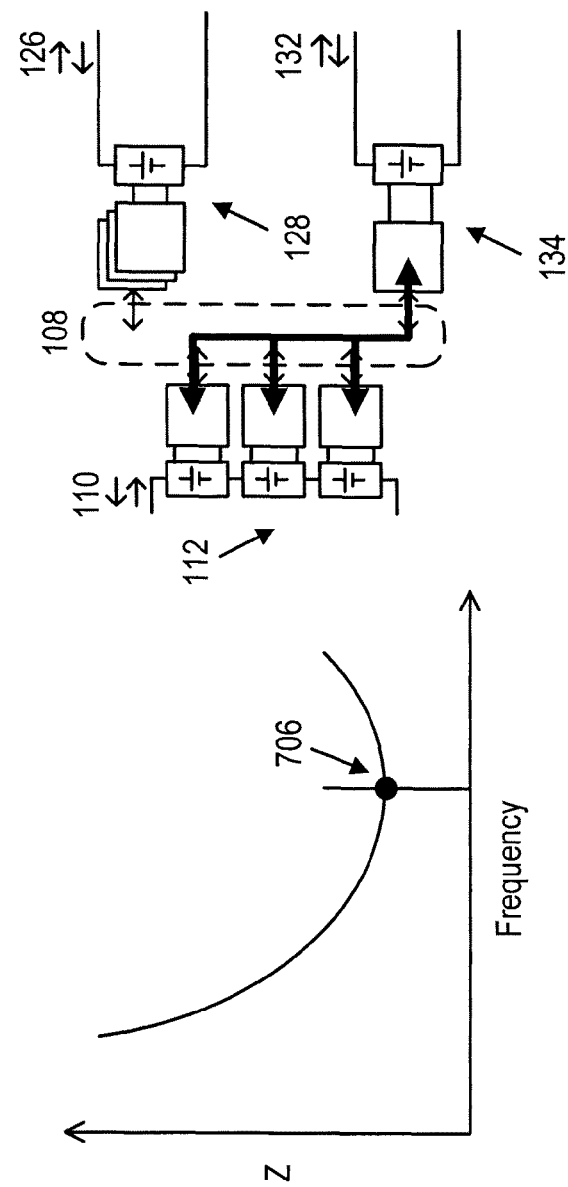
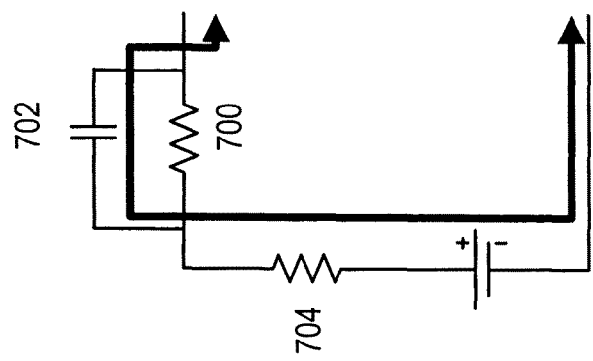
Fig. 7C
Fig. 7B
Fig. 7A

MODULAR WIRELESS ELECTRICAL SYSTEM

BACKGROUND

Bi-directional, wireless power transfer can be conducted among electric power modules in a vehicle. U.S. Patent Application Publication No. 2011/0254377 A1 entitled "Wireless Power Transmission in Electric Vehicles" by Wildmer et al. describes a bi-directional wireless power transceiver that can wirelessly transfer power between a charging station, battery substation, and electric vehicle systems.

SUMMARY

In an exemplary implementation, a system can include: electric power modules, RF converter circuitry within the electric power modules that meets voltage and power characteristics of the electric power modules, and control circuitry. The control circuitry can: process sensor data to determine a wireless power transfer path; align first RF converter circuitry of a first electric power module as a transmitter to establish the first electric power module as a power source; establish an electromagnetic field as a wireless power transfer area; align second RF converter circuitry of a second electric power module as a receiver to establish the second electric power module as an electrical load; and control power transfer between the electric power modules through the wireless power transfer area.

The system can establish parallel paths of the power transfer between the electric power modules. The parallel paths of the power transfer between the electric power modules can include a bi-directional voltage converter.

The system can maintain continuity of power to electric components of a vehicle when at least one of the electric power modules is in a degraded condition.

The electric power modules can include one or more battery cells, and the system can control warm-up the one or more battery cells. The warm-up of the one or more battery cells can include circulating wireless reactive power between the electric power modules via the wireless power transfer area at a predetermined frequency that can be a frequency at which impedance within the battery cell is at an approximate minimum.

The electric power modules can include photovoltaic cells, super capacitors, or fuel cells. The electric power modules can also include an AC/DC converter for battery charging from an AC outlet.

The electric power modules can provide electric power to one or more electric components of a vehicle, and the voltage and power characteristics of the electric power modules can be unequal. The electric power modules can operate as either power sources or electrical loads.

The RF converter circuitry within the electric power modules can operate bi-directionally as either transmitter or receiver. The RF converter circuitry can be connected in series or parallel to match the voltage and power characteristics of the electric power modules that are unequal to the voltage and power characteristics of the RF converter circuitry.

The system can control the wireless power transfer to maintain state of charge of battery cells within the electric power modules. The system can control the wireless power transfer during the battery charging from the AC outlet with the AC/DC converter.

In another exemplary implementation, a process can include: processing sensor data to determine a wireless power transfer path; aligning at least one of the RF converter circuits as a transmitter to establish at least one of the electric power modules as a power source; establishing an electromagnetic field as a wireless power transfer area; aligning at least one of the RF converter circuits as a receiver to establish at least one of the electric power modules as an electrical load; and controlling power transfer between the electric power modules through the wireless power transfer area. A non-transitory computer-readable storage medium including executable instructions, which when executed by circuitry, can cause the circuitry to perform the process.

A further exemplary implementation can include control circuitry that can process sensor data to determine a wireless power transfer path; align at least one of the RF converter circuits as a transmitter to establish at least one of the electric power modules as a power source; establish an electromagnetic field as a wireless power transfer area; align at least one of the RF converter circuits as a receiver to establish at least one of the electric power modules as an electrical load; and control power transfer between the electric power modules through the wireless power transfer area.

The foregoing general description of exemplary implementations and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIGS. 4A-4E illustrate exemplary implementations of modular wireless electrical systems;

FIGS. 7A-7C illustrate battery cell warm-up; and

DETAILED DESCRIPTION

Figure 1:
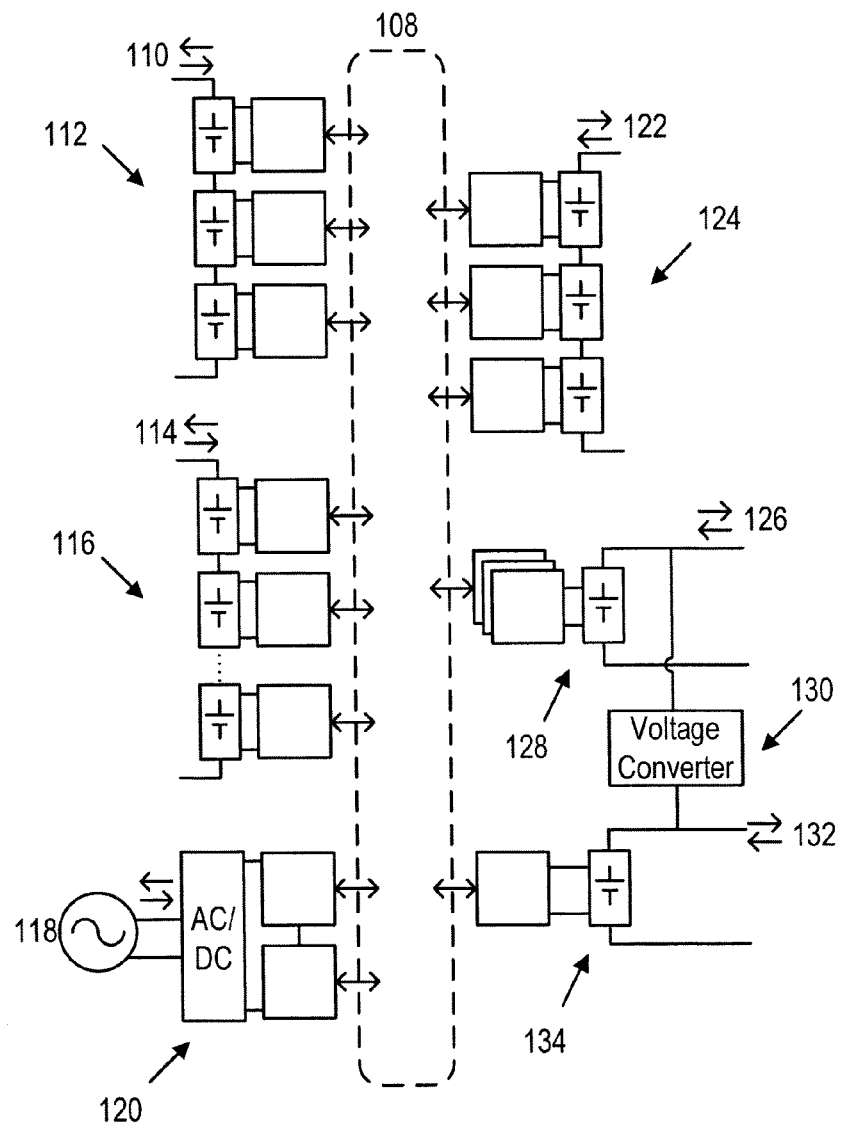
FIG. 1 is an exemplary illustration of a modular wireless electrical system.

In the drawings, like reference numerals designate identical or corresponding parts throughout the several views.

Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "about," and similar terms generally refer to ranges that include the identified value within a margin of 20%, 10%, or preferably 5%, and any values therebetween.

FIG. 1 is an exemplary illustration of a modular wireless electrical system 100. The modular wireless electrical system 100 includes one or more electric power modules that can be assembled based on a particular application. In some implementations, the electric power modules include one or more lithium-ion (Li-ion), nickel-metal hydride (NiMH), or other types of battery cells arranged in series and/or parallel configurations. One type of electric power module is a hybrid vehicle (HV) battery module 112. According to some aspects, the HV battery module 112 supplies power to a high voltage terminal 110 that can power components of a hybrid vehicle such as an electric motor. The HV battery module 112 can also be used as a power source for a wireless power transfer area 108. In some aspects, the HV battery module 112 can perform multiple functions that can include establishing the wireless power transfer area 108, providing power to the high voltage terminal 110, or battery cell balancing.

Another type of electric power module is an additional HV battery pack 116 that can be installed in electric vehicles that are traveling for extended ranges without the ability to conduct charging operations. According to some aspects, the additional HV battery pack 116 supplies power to an additional high voltage terminal 114 that can power components of a hybrid vehicle such as an electric motor for extended range driving. The additional HV battery pack 116 can also be used as a power source for the wireless power transfer area 108. In some aspects, the additional HV battery pack 116 can perform multiple functions that can include establishing the wireless power transfer area 108, providing power to the additional high voltage terminal 114, or battery cell balancing.

Another type of electric power module is an AC/DC converter module 120 that can be used in battery charge and/or discharge operations. In some aspects, the AC/DC converter module 120 can be a pulse width modulation (PWM) rectifier, a power factor correction (PFC) converter, or the like that can receive power from an AC outlet 118 to conduct charging operations. The RF converter circuits that are part of the AC/DC converter module 120 can then act as transmitters to wirelessly transfer power to other electric power modules through the wireless power transfer area 108. During battery discharge operations, the RF converter circuits that are a part of the AC/DC converter module 120 can act as receivers to wirelessly receive power from other electric power modules that are discharging their batteries.

Another type of electric power module is an alternate power source module 124. Examples of alternate power sources include photovoltaic cells, fuel cells, super capacitors, and the like. According to some aspects, the alternate power source module 124 supplies power to an alternate power source terminal 122 that can power components of a hybrid vehicle such as an electric axial-flux generator. The alternate power source module 124 can also be used as a power source for the wireless power transfer area 108. In some aspects, the alternate power source module 124 can perform multiple functions that can include establishing the wireless power transfer area 108, providing power to the alternate power source terminal 122, or battery cell balancing.

Another type of electric power module is a middle voltage (approximately 42V) power source module 128. According to some aspects, the middle voltage power module 128 supplies power to a middle voltage terminal 126 that can power components of a hybrid vehicle that consume a quantity of power that may larger than other electric loads in the vehicle, such as electric brakes, power steering, and/or heaters. The middle voltage power module 128 can also be used as a power source for the wireless power transfer area 108. In some aspects, the middle voltage power module 128 can perform multiple functions that can include establishing the wireless power transfer area 108, providing power to the middle voltage power terminal 126, or battery cell balancing.

Another type of electric power module that can be included in the modular wireless electrical system 100 is a 12V-14V lead (Pb) battery module 134. According to some aspects, the 12-14V Pb battery module 134 supplies power to a 12V terminal 132 that can power a plurality of electrical loads within the vehicle such as lights, starter motor, audio system, and the like. The 12-14V Pb battery module 134 can also be used as a power source for the wireless power transfer area 108. In some aspects, the 12-14V Pb battery module 134 can perform multiple functions that can include establishing the wireless power transfer area 108, providing power to the 12V terminal 132, or battery cell balancing. Another type of 12-14V battery module that does not rely on a lead-acid reaction can also be used, but for simplicity, reference to a Pb battery module herein refers to a 12-14V battery module.

In some aspects, a bi-directional voltage converter 130 is installed between the middle voltage power source 128 and the 12-14V Pb battery module 134 to provide a power flow path that is parallel to the wireless power transfer area 108. In some implementations, power can be transferred from the middle voltage power source 128 to supply power to the 12-14V Pb battery module 134. In some aspects, power can also be transferred from the 12-14V Pb battery module 134 to the middle voltage power source 128. Details regarding aspects of parallel power flow are discussed further herein.

In certain implementations, additional modules may be installed in the modular wireless electrical system 100 to provide greater functionality to the system, which may include greater battery capacity and/or higher or lower voltage capability. In addition, by adding additional electric power modules, the modular wireless electrical system 100 may not suffer the risk of becoming saturated so that in some aspects, there is not an upper limit on the number of electrical power modules that can be added. Additionally, according to certain implementations, fewer electric power modules can be installed in the modular wireless electrical system 100 than those described herein.

Figure 2B:
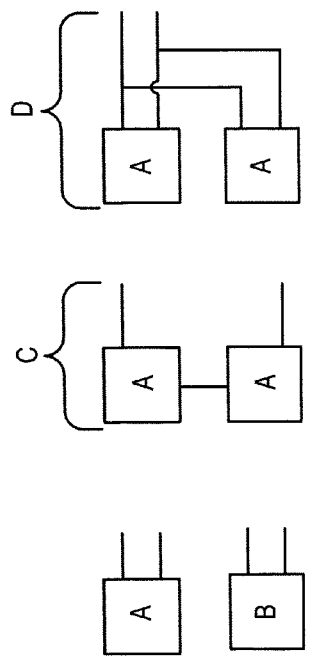
FIG. 2B illustrates exemplary RF converter circuit configurations.
Figure 2C:
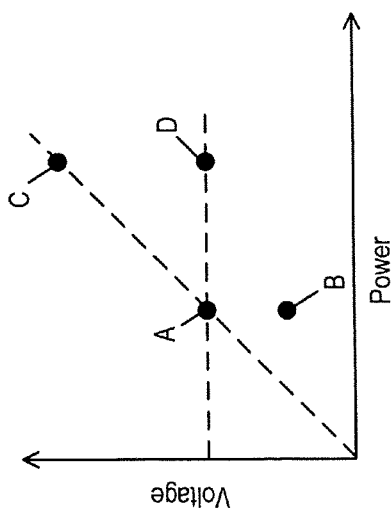
FIG. 2C illustrates an exemplary graph of voltage versus power for RF converter circuit configurations.
Figure 2A:
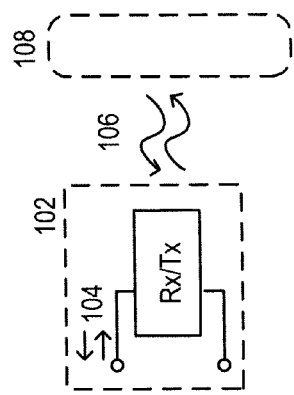
FIG. 2A is an exemplary illustration of a RF converter circuit.

Next, FIG. 2A illustrates a radio frequency (RF) converter circuit 102 that represents a basic unit of wireless power transfer. In order to align the electric power modules as sources or loads, the RF converter circuit 102, which includes RF converter circuitry, can function as either a transmitter or a receiver, which allows for bi-directional wireless power transfer. In some aspects, the RF converter circuit 102 can be configured so that a terminal 104 supplies power to the RF circuit 102 which in turn transmits wireless RF power 106 through an antenna to establish an electromagnetic field, which functions as the wireless power transfer area 108. In one implementation, the HV battery module 112 is acting as a load, such as when a battery cell is being charged. In this example, the RF converter circuit 102 can be configured to act as a receiver by converting wireless energy received from the wireless power transfer area 108 at an antenna to electrical power that can be transferred to the HV battery module 112. At least one bi-directional RF converter circuit 102 is installed within each electric power module.

Next, FIG. 2B is an exemplary illustration of RF converter circuit configurations. The RF converter circuit 102 represents the basic unit of wireless power transfer between the electric power modules. In some implementations, the electric power modules within the modular wireless electrical system 100 have unequal voltage and power characteristics. For example, in some implementations, the HV battery module 112 and the 12-14V Pb battery module 134 have unequal voltage and power characteristics. The RF converter circuits within the electric power modules having unequal voltage and power characteristics can be arranged in series and/or parallel configurations so that the electric power modules can transfer power across the shared wireless power transfer area 108. FIG. 2C illustrates an exemplary graph of voltage versus power for RF converter circuit configurations.

In some implementations, a type A RF converter circuit can be installed in an electric power module that has voltage and power characteristics that are approximately equal to the voltage and power characteristics of the type A RF converter circuit. For example, the type A RF converter circuit could be installed in the HV battery module 112. In some implementations, the number of RF converter circuits that are installed in an electrical power module can be equal to the number battery cells in the electric power module. Next, a type B RF converter circuit can be installed in an electric power module that has a lower voltage than the electric power module in which the type A RF converter circuit is installed. For example, in some implementations, the type B RF converter circuit can be installed in the 12-14V Pb battery module 134.

Next, a type C RF converter circuit includes a plurality of the type A RF converter circuits connected to one another in a series configuration according to some implementations. In some aspects, the type C RF converter circuit can include series-connected RF converter circuits with other voltage and power characteristics such as the type B RF converter circuit. The series configuration of the RF converter circuits enables the type C RF converter circuit to be installed in electric power modules that have higher voltage and power characteristics than other electric power modules. For example, in some implementations, the type C RF converter circuit can be installed in the AC/DC converter module 120.

Next, a type D RF converter circuit includes a plurality of the type A RF converter circuits connected to one another in a parallel configuration according to some implementations. In some aspects, the type D RF converter circuit can include parallel-connected RF converter circuits with other voltage and power characteristics such as the type B RF converter circuit. The parallel configuration of the RF converter circuits enables the type C RF converter circuit to be installed in electric power modules that have higher power characteristics than other electric power modules in the modular wireless electrical system 100. For example, in some implementations, the type D RF converter circuit can be installed in the middle voltage power module 128 that supplies power to loads such as electric brakes, power steering, and/or heaters.

Table 1 illustrates exemplary voltage characteristics of the RF converter circuits according to certain implementations. For example, one RF converter circuit 102 with a voltage of approximately 14V can be installed in the 12-14V Pb battery module 134. In addition, three RF converter circuits connected in series can have a voltage of approximately 42V that can be installed in the middle voltage power source module 128. Ten RF converter circuits connected in series can have a voltage of approximately 144V that can be installed in the HV battery module 112. Any number of RF converter circuits can be combined in series or parallel to meet the voltage and power characteristics of the electric power modules that are installed in the wireless modular power transfer system 100.

TABLE 1

| # of RF Converter Circuits | Minimum Voltage | Middle Voltage | Maximum Voltage |
| --- | --- | --- | --- |
| 1 | 12.4 | 14 | 16 |
| 3 | 37.2 | 42 | 48 |
| 10 | 124 | 144 | 160 |
| 12 | 148 | 168 | 192 |
| 15 | 186 | 210 | 240 |

Figure 2D:
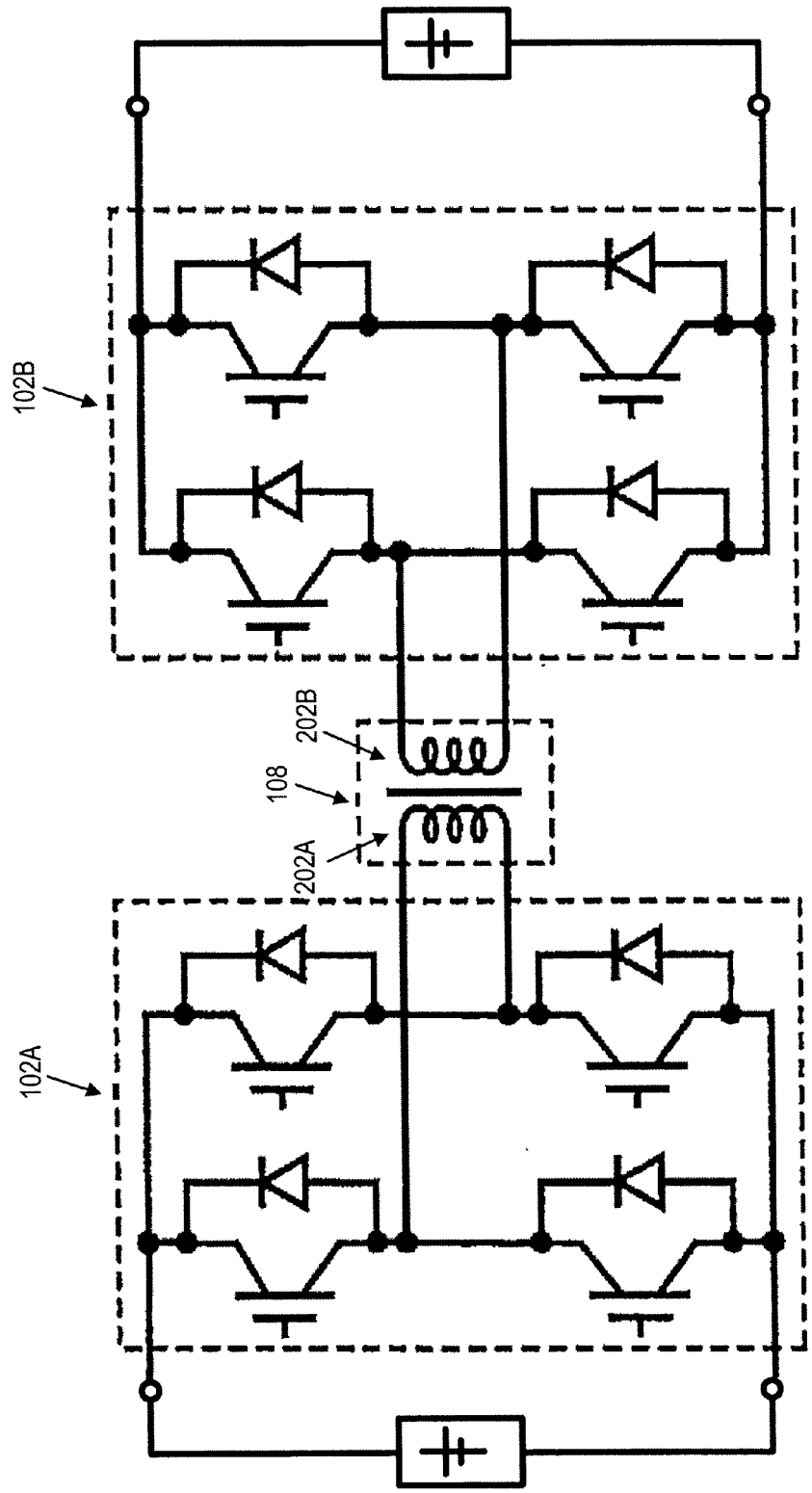
FIG. 2D is an exemplary illustration of a circuit diagram of bi-directional RF converter circuits.

FIG. 2D is an illustration of a circuit diagram of exemplary bi-directional RF converter circuits. Each of RF converter circuits 102A and 102B can include a single-phase bridge circuit capable of converting power bi-directionally. In an exemplary implementation, RF converter circuit 102A converts the DC power received from a battery cell into AC power and outputs it to a transformer coil 202A, based on a control signal from an electronic control unit (ECU), which can include the control circuitry discussed herein.

The transformer coil 202A can act as either a primary or secondary side of a transformer based on the direction of power transfer. When power is being transferred from the RF converter circuit 102B to the RF converter circuit 102A, the RF converter circuit 102A can convert AC power received from the transformer coil 202A into DC power and output it to a battery cell. In addition, the RF converter circuit 102B can convert the DC power received from a battery cell into AC power and output it to a transformer coil 202B, based on a control signal from an ECU.

The transformer coil 202B can act as either a primary or secondary side of a transformer based on the direction of power transfer. When power is being transferred from the RF converter circuit 102A to the RF converter circuit 102B, the RF converter circuit 102B can convert AC power received from the transformer coil 202B into DC power and output it to a battery cell. In certain implementations, the transformer coil 202A and the transformer coil 202B are electrically isolated. In some aspects, the transform coils 202A and 202B can function as antennas that wirelessly transfer power to establish the electromagnetic field that forms the wireless power transfer area 108.

Figure 3:
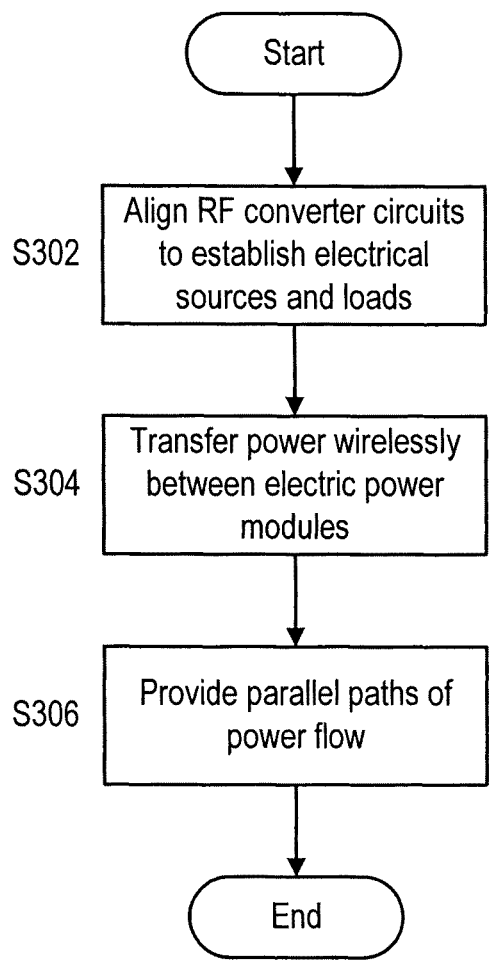
FIG. 3 illustrates an exemplary wireless power transfer process.

FIG. 3 illustrates an exemplary wireless power transfer process 300. The type of wireless power transfer process 300 being conducted within the wireless power transfer system 100 can be controlled by one or more ECUs or similar circuitry. Sensors installed within the electric power modules can sense battery state of charge (SOC), voltage, RF converter circuit configuration, and the like. The ECUs can process sensor data, display electric power module information to a user, and send control signals to actuators that align the wireless power transfer system to maintain the battery cells at a predetermined SOC. In some implementations, the actuators send control signals to align transmitter and receiver antennas of the RF converter circuits to provide coupling at a desired frequency for wireless power transfer. In addition, the actuators send control signals to align the RF converter circuits as either transmitters or receivers. The ECUs can also align the wireless power transfer system 100 to perform functions determined by input from a user.

At step S302, the RF converter circuits in the electric power modules are aligned by a signal from control circuitry that establishes electrical sources and loads for the modular wireless electrical system 100. In some implementations, at least one RF converter circuit 102 can be aligned as a transmitter to establish at least one of the electric power modules as the power source for the electromagnetic field that functions as the wireless power transfer area 108. In addition, at least one RF converter circuit 102 can be aligned as a receiver to establish at least one of the electric power modules as an electrical load.

For example, in one implementation, at least one cell of the HV battery module 112 can be the power source for battery balancing with the 12-14V Pb battery module 134, which functions as the electrical load. In the example, control circuitry processes the SOC and voltage sensor data from the battery cells and determines the at least one battery cell with the highest SOC that will function as the power source for the battery balancing. The RF converter circuit 102 in the at least one cell of the HV battery module 112 that is the power source for the battery balancing is aligned as a transmitter to establish the wireless power transfer area 108. In addition, the RF converter circuit 102 in the 12-14V Pb battery module 134 can be aligned as a receiver in order to establish the 12-14V Pb battery module 134 as an electrical load. According to some aspects, one or more of the cells of the HV battery module 112 can also function as electrical loads during the battery balancing. The RF converter circuits in the one or more cells of the HV battery module 112 that are functioning as electrical loads are also aligned as receivers in order to wirelessly receive power from the at least one cell of the HV battery module 112.

At step S304, power is wirelessly transferred between the electric power modules via the wireless power transfer area 108. In some implementations, the electric power modules with RF converter circuits that are aligned as transmitters wirelessly transfer power to the electric power modules with RF converter circuits that are aligned as receivers. In certain aspects, power is wirelessly transferred between electric power modules via the wireless power transfer area 108. According to some implementations, the electric power modules that are functioning as power sources can be switched to function as loads by aligning the RF converter circuits as receivers. Whether the electric power modules are functioning as a power source or electrical load is based on the type of process being carried out by the wireless power transfer system. According to some aspects, some types of wireless power transfer processes can include battery cell balancing, battery state of charge (SOC) control, battery charging, battery discharging, or the like. In one example, an electric vehicle is at a charging station where the AC/DC converter module 120 is connected to the AC outlet 118.

The AC/DC converter module 120 can be connected to the AC outlet 118 via either a wired or a wireless connection. In this example, the control circuitry senses when the AC/DC converter module 120 is plugged into the AC outlet 118 and aligns the one or more RF converter circuits installed in the AC/DC converter module 120 as transmitters to establish the wireless power transfer area 108 and transfer power to charge the battery cells of the other electric power modules. In some implementations, a user can send an input signal to the control circuitry via a controller to align the modular wireless power transfer system 100 to charge battery cells as desired by the user. The RF converter circuits installed in the electric power modules of the battery cells being charged are aligned as receivers to wirelessly receive the electric power being transferred from the AC/DC converter module 120.

At step S306, parallel paths of power flow are provided between the electric power modules. In some implementations, the bi-directional voltage converter 130 is installed between the middle voltage power source 128 and the 12-14V Pb battery module 134 to provide a power flow path that is parallel to the wireless power transfer area 108. In some implementations, power can be transferred from the middle voltage power source 128 to supply power to the 12-14V Pb battery module 134. In some aspects, power can also be transferred from the 12-14V Pb battery module 134 to the middle voltage power source 128. By adding the path of power flow that is parallel to the wireless power transfer area 108, additional redundancy is added to the modular wireless electrical system 100 so that damage to one cell in of an electric power module does not preclude continuity of power. In some implementations, the sensor data processed by the control circuitry can indicate damage to one or more battery cells. In one example where the 12-14V Pb battery module 134 is damaged, the sensor data may indicate erratic and/or low battery voltage, SOC, or current. In this situation, the control circuitry can implement the parallel path of power transfer through the bi-directional voltage converter 130 to align power to the 12V terminal 132.

Figure 4E:
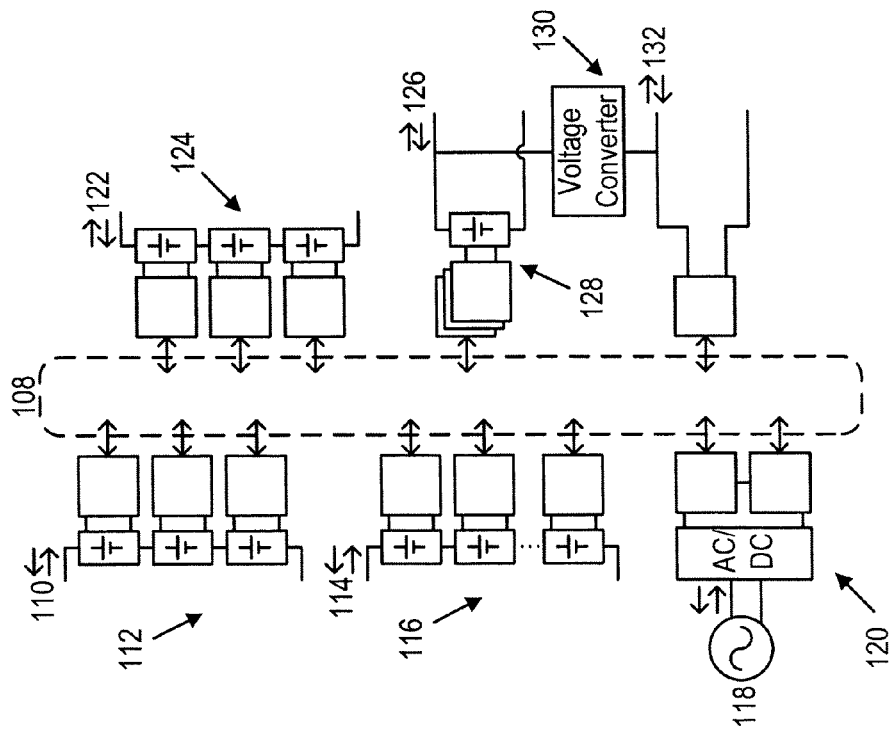

FIGS. 4A-4E illustrate exemplary implementations of modular wireless electrical systems. FIG. 4A is an exemplary illustration of the modular wireless electrical system 100 in a micro hybrid vehicle. In one implementation, a gasoline engine 400 is started by an alternator 402, which is powered by the 12-14V Pb battery module 134. In some implementations, the gasoline engine 400 shuts down when the car stops, such as at a stoplight, and the electric power modules are responsible for providing power to the electric components of the vehicle. When a driver depresses an accelerator to put the vehicle in motion, the alternator 402 receives power from the 12-14V Pb battery module 134 to restart the gasoline engine 400.

In some implementations, the 12-14V Pb battery module 134 supplies power to a 12V terminal 132 that powers the plurality of electrical loads within the vehicle such as the lights, starter motor, audio system, and the like consistent with the above discussions. In addition, another type of electric power module that can be included the in the micro hybrid vehicle is the middle voltage (approximately 42V) power source module 128. The battery cells of the middle voltage power source module 128 can power components of the micro hybrid vehicle that consume a large quantity of power as compared to other electrical loads, such as electric brakes, power steering, and/or heaters as discussed previously.

FIG. 4B is an exemplary illustration of a modular wireless electrical system in a hybrid vehicle. In one implementation, one type of electric power module that can be installed in the hybrid vehicle is the HV battery module 112 that can components of a hybrid vehicle as consistent with the above discussion. Another type of electric power module that the hybrid vehicle is the 12V-14V lead (Pb) battery module 134 that supplies power to the 12V terminal 132 that can power a plurality of electrical loads within the vehicle, which can include lights, starter motor, audio system, and the like as previously discussed.

FIG. 4C is an exemplary illustration of a modular wireless electrical system in an advanced hybrid vehicle. The advanced hybrid vehicle can include the middle voltage (approximately 42V) power source module 128 to provide an additional power source for electrical loads that consume a large quantity of power as compared to other electrical loads as previously discussed. Another type of electric power module that can be included in the advanced hybrid vehicle is the HV battery module 112 that can power components of a hybrid vehicle such as an electric motor and other components consistent with the above discussions. In addition, another type of electric power module that can be included in the advanced hybrid vehicle is the 12V-14V Pb battery module 134 that can power to a plurality of electrical loads within the vehicle as previously discussed.

A bi-directional voltage converter 130 can be installed between the middle voltage power source 128 and the 12-14V Pb battery module 134 to provide a power flow path that is parallel to the wireless power transfer area 108. In some implementations, power can be transferred from the middle voltage power source 128 to supply power to the 12-14V Pb battery module 134. Power can also be transferred from the 12-14V Pb battery module 134 to the middle voltage power source 128.

Figure 4D:
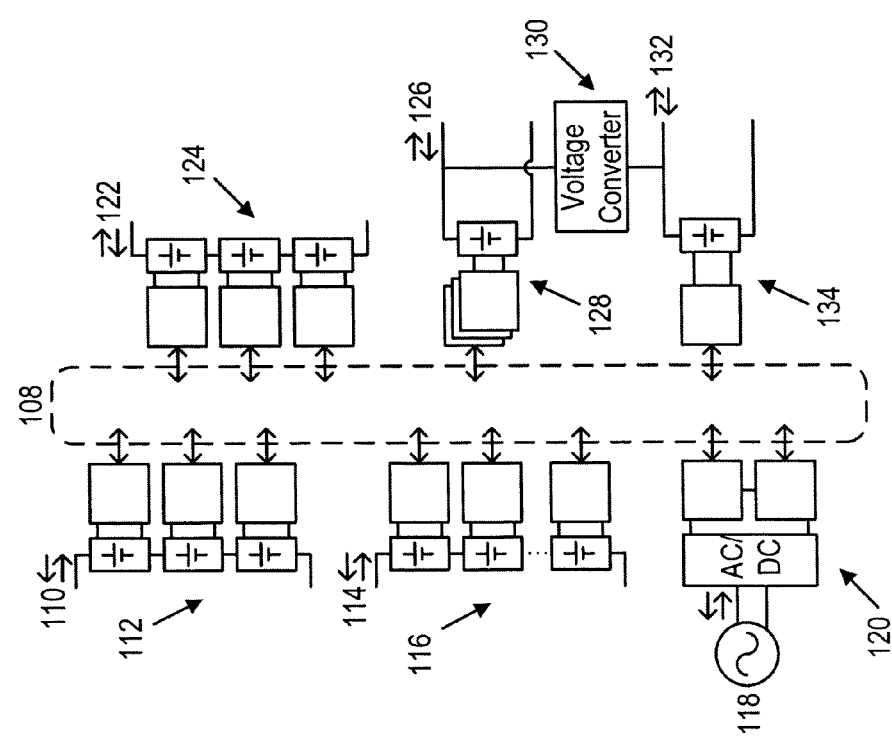

FIG. 4D is an exemplary illustration of a modular wireless electrical system in a plug-in hybrid vehicle (PHV). The PHV can include the AC/DC converter module 120 that can be used in battery charge and discharge operations. The AC/DC converter module 120 can be a pulse width modulation (PWM) rectifier, a power factor correction (PFC) converter, or the like that can receive power from an AC outlet 118 to conduct charging operations consistent with the previous discussions. Another type of electric power module that can be included in the PHV is the additional HV battery pack 116 for electric vehicles that are traveling for extended ranges without the ability to conduct charging operations as previously discussed. Another type of electric power module that can be included in the PHV is the HV battery module 112 that can power components of a hybrid vehicle as previously discussed. Another type of electric power module that can be included in the PHV is the alternate power source module 124. Examples of alternate power sources include photovoltaic cells, fuel cells, super capacitors, and the like as previously discussed. Another type of electric power module that can be in the PHV is the middle voltage (approximately 42V) power source module 128 that can power components of a hybrid vehicle that consume a large quantity of power as compared to other electrical loads consistent with the previous discussions. Another type of electric power module that can be included the in the PHV is the Pb battery module 134 that can power a plurality of electrical loads within the vehicle as previously discussed.

A bi-directional voltage converter 130 can be installed between the middle voltage power source 128 and the 12-14V Pb battery module 134 to provide a power flow path that is parallel to the wireless power transfer area 108. In some implementations, power can be transferred from the middle voltage power source module128 to supply power to the 12-14V Pb battery module 134. Power can also be transferred from the 12-14V Pb battery module 134 to the middle voltage power module 128.

FIG. 4E is an exemplary illustration of a modular wireless electrical system 100 in the PHV without a 12-14V Pb battery. The modular wireless electrical system in this implementation includes the same electric power modules as the PHV from FIG. 4D except for the 12-14V battery. The 12V terminal 132 can receive electrical power from one of the other electric power modules via the wireless power transfer area 108 or the bi-directional voltage converter 130. In some aspects, electrical loads that are powered by the 12-14V Pb battery can include loads of the vehicle such as electronic control units (ECUs), brake systems, security systems, and the like. However, since the electric power modules in the PHV are connected in a parallel configuration, the 12-14V Pb battery can be removed and a risk of losing power to the electrical loads that receive power from the 12V terminal can be reduced.

Figures 5A, 5B, 5C:
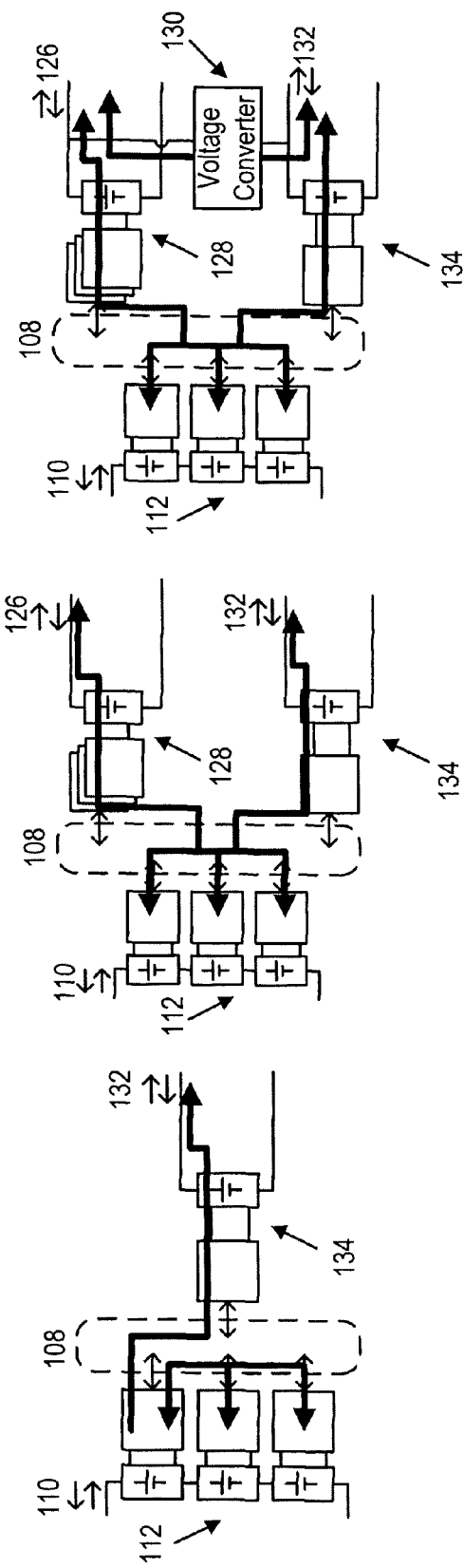
FIG. 5A is an exemplary illustration of wireless power transfer during battery cell balancing.
FIG. 5B is an exemplary illustration of wireless power transfer between electric power modules.
FIG. 5C is an exemplary illustration of wireless power transfer between electric power modules with a bi-directional voltage converter.

FIGS. 5A-5C illustrate exemplary implementations of wireless power transfer. FIG. 5A is an exemplary illustration of wireless power transfer during battery cell balancing. In one implementation, at least one cell of the HV battery module 112 can be the power source for battery balancing with the 12-14V Pb battery module 134, which functions as the electrical load. In the example, control circuitry processes the SOC and voltage sensor data from the battery cells and determines the at least one battery cell with the highest SOC that will function as the power source for the battery balancing. The RF converter circuit 102 in the at least one cell of the HV battery module 112 that is the power source for the battery balancing is aligned as a transmitter to establish the wireless power transfer area 108. In addition, the RF converter circuit 102 in the 12-14V Pb battery module 134 can be aligned as a receiver in order to establish the 12-14V Pb battery module 134 as an electrical load. One or more of the cells of the HV battery module 112 can also function as electrical loads during the battery balancing. The RF converter circuits in the one or more cells of the HV battery module 112 that are functioning as electrical loads are also aligned as receivers in order to wirelessly receive power from the at least one cell of the HV battery module 112.

FIG. 5B is an exemplary illustration of wireless power transfer between electric power modules. In this example, the wireless power transfer system 100 includes the HV battery module 112, the middle voltage power module 128, and the 12-14V Pb battery module 134. Electric power can be transferred between the electric power modules through the wireless power transfer area 108. The control circuitry determines the power source for the wireless power transfer area 108 and other electrical loads based on the sensor data from the battery cells. In some implementations, the control circuitry selects the power source as the electric power module whose battery cells have the highest SOC. In some implementations, the HV battery module 112 can be a power source for the middle voltage power module 128 and/or the 12-14V PB battery module 134 to wirelessly transfer power to electric loads tied to the middle voltage terminal 126 and/or the 12V terminal 132. In addition, the middle voltage power module 128 can be a power source for the HV battery module 112 and/or the 12-14V PB battery module 134 to wirelessly transfer power to electric loads tied to the high voltage terminal 110 and/or the 12V terminal 132. The 12-14V Pb battery module 134 can also be a power source for the HV battery module 112 and/or the middle voltage power module 128 to wirelessly transfer power to electric loads tied to the high voltage terminal 110 and/or the middle voltage terminal 126.

FIG. 5C is an exemplary illustration of wireless power transfer between electric power modules with a bi-directional voltage converter. In this example, the wireless power transfer system 100 includes the HV battery module 112, the middle voltage power module 128, the 12-14V Pb battery module 134, and the bi-directional voltage converter 130. In some implementations, the HV battery module 112 can be a power source for the middle voltage power module 128 and/or the 12-14V Pb battery module 134 to wirelessly transfer power to electric loads tied to the middle voltage terminal 126 and/or the 12V terminal 132. In this example, the power is transferred between the electric power modules through the wireless power transfer area 108. In addition, the middle voltage power module 128 can be a power source for the HV battery module 112 and/or the 12-14V Pb battery module 134 to wirelessly transfer power to electric loads tied to the high voltage terminal 110 and/or the 12V terminal 132.

In this example, electric power can be transferred from the middle voltage power module 128 to the HV battery module 112 via the wireless power transfer area 108. In addition, electric power can be transferred from the middle voltage power module 128 to the 12-14V Pb battery module 134 via wireless power transfer area 108 and/or the bi-directional voltage converter 130. The 12-14V Pb battery module 134 can also be a power source for the HV battery module 112 and/or the middle voltage power module 128 to wirelessly transfer power to electric loads tied to the HV battery module 112 and/or the middle voltage terminal 126. In this example, electric power can be transferred from the 12-14V Pb battery module 134 to the HV battery module 112 via the wireless power transfer area 108. In addition, electric power can be transferred from the 12-14V Pb battery module 134 to the middle voltage power module 128 via wireless power transfer area 108 and/or the bi-directional voltage converter 130.

In some implementations, the control circuitry aligns power through the bi-directional voltage converter 130 when damage to a battery cell is detected based on erratic or abnormal SOC, voltage, and/or current sensor data from the battery cell. Damage to battery cells can also be detected by a loss of power to the loads supplied by that battery cell. For example, if damage is detected in the 12-14V Pb battery module 134, the control circuitry can implement the parallel path of power transfer through the bi-directional voltage converter 130 to align power to the 12V terminal 132.

Figure 6A:
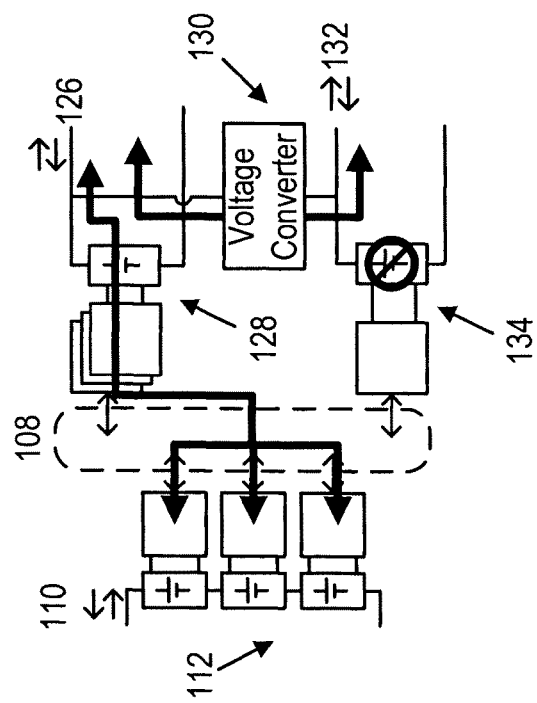
FIGS. 6A-6B are exemplary illustrations of wireless power transfer in situations of damage to the electric power modules.
Figure 6B:
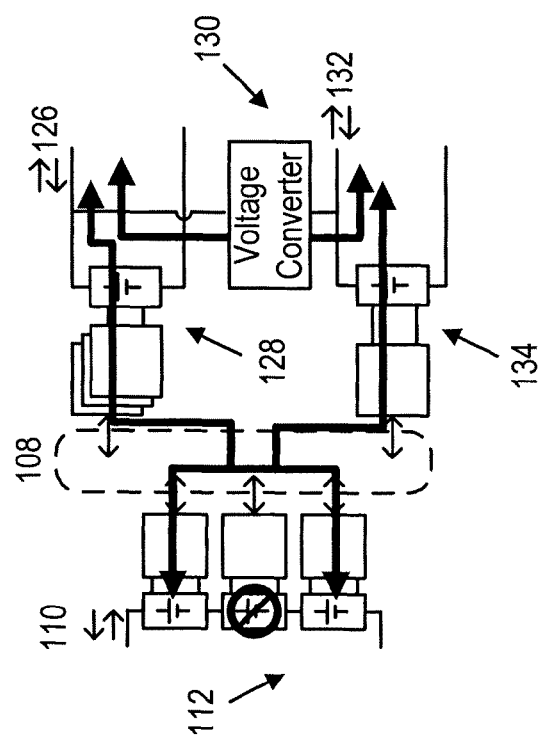

FIGS. 6A and 6B are exemplary illustrations of wireless power transfer in situations of damage to the electric power modules. FIG. 6A is an illustration of wireless power transfer when a battery cell of the HV battery module 112 is damaged according to one implementation. The electric loads tied to the high voltage terminal 110 are still able to receive power through the parallel paths of power flow that include the wireless power transfer area 108 and the bi-directional voltage converter 130. The parallel paths of power flow maintain continuity of power to the loads served by the HV battery module 112. According to one aspect, the electric loads tied to the high voltage terminal 110 can receive power from the middle voltage power module 128 and/or the 12-14V Pb battery module 134 via the wireless power transfer area 108. The electric loads tied to the high voltage terminal 110 can also receive power from the middle voltage power module 128 and/or the 12-14V Pb battery module 134 by transmitting power through the bi-directional voltage converter 130 and then across the wireless power transfer area 108.

When a problem with the battery cell is detected based on erratic or abnormal SOC, voltage, and/or current sensor data from the battery cell, the processing circuitry places the modular wireless electrical system 100 in a safe mode that implements the parallel paths of power flow to maintain continuity of power. The safe mode of the modular wireless electrical system can also be used in a maintenance environment so that the damaged battery cell can be replaced without having to replace the entire electric power module.

In some implementations, the sensor data processed by the control circuitry can indicate damage to one or more battery cells. In one example where a battery cell of the HV battery module 112 is damaged, the sensor data may indicate erratic and/or abnormally high or low battery voltage, SOC, or current. Damage to battery cells can also be detected by a loss of power to the loads supplied by that battery cell. In this situation, the control circuitry can implement the parallel path of power transfer through the bi-directional voltage converter 130 to align power to the electric loads tied to the high voltage terminal 110 as previously discussed.

FIG. 6B is an illustration of wireless power transfer when a battery cell of the 12-14V Pb battery module 134 is damaged according to one implementation. The electric loads tied to the 12V terminal 132 are still able to receive power through the parallel paths of power flow that include the wireless power transfer area 108 and the bi-directional voltage converter 130. The parallel paths of power flow maintain continuity of power to the loads served by the 12-14V Pb battery module 134. The electric loads tied to the 12V terminal 132 can receive power from the middle voltage power module 128 via the bi-directional voltage converter. In addition, the electrical loads tied to the 12V terminal 132 can receive power from the HV battery module 112 by transmitting power across the wireless power transfer area 108 and then through the bi-directional voltage converter 130. If a problem with the battery cell is detected, the sensor data may indicate erratic and/or abnormally high or low battery voltage, SOC, or current. In this situation, the processing circuitry places the modular wireless electrical system 100 in a safe mode that implements the parallel paths of power flow to maintain continuity of power.

FIGS. 7A-7C illustrate battery cell warm-up. FIG. 7A is an illustration of an equivalent circuit for an exemplary battery cell. At low temperatures, resistor 700 can experience high currents that can cause the battery cell to deteriorate at a rate that is faster than the deterioration rate at higher temperatures. Therefore, conducting the battery cell warm-up can minimize early deterioration of the battery cell. In some implementations, an impedance of the battery cell from resistor 704 and capacitor 702 varies with frequency of the AC current.

FIG. 7B is an illustration of an exemplary graph of the battery impedance, Z, with respect to the frequency. The battery impedance reaches an approximately minimum value at frequency 706. In some aspects, the frequency of the RF converter circuits of the electric power modules is set at the frequency 706 so that the wireless reactive power flow between the electric power modules warms up the battery cells with approximately minimal battery cell impedance.

FIG. 7C is an illustration of a wireless power transfer system 100 during the battery cell warm up. In some implementations, power is transferred through the wireless power transfer area 108 to warm up the battery cells of the HV battery module 112 and the 12-14V Pb battery module 134 at the frequency 706. One or more temperature sensors measure the temperature of the battery cells and send input signals to the processing circuitry that controls the battery cell warm-up.

Aspects of this disclosure relate to modular wireless power transfer. In some implementations, RF converter circuits are aligned to wirelessly transfer power between electric power modules in order to charge and/or discharge battery cells, balance charge between battery cells, and provide power to electric components. Based on signals received from sensors, the processing circuitry can output control signals that are sent to one or more actuated components of the modular wireless power transfer system. In some implementations, the sensors can include battery voltage sensors, temperature sensors, current sensors, or sensors that can detect opening or closing of a switch. The actuated components can include the one or more RF converter circuits and/or the electric components that are powered by the electric power modules. According to an implementation, the state of charge of the battery cells of the HV battery module 112 may be unbalanced. Control signals may be transmitted to the appropriate RF converter circuits to be aligned as transmitters and/or receivers to execute the battery balancing process.

Blocks or circuits of computer architecture (i.e., circuitry) shown or described herein can be implemented in a single processing system, or distributed across a plurality of processing systems, which may be referred to as separate processors or circuits. For instance, each of the blocks of architecture can be a discrete processor, system, or logic component. Further, exemplary functions or features can be performed by common circuitry or by a general purpose processor executing specific instructions.

Figure 8:
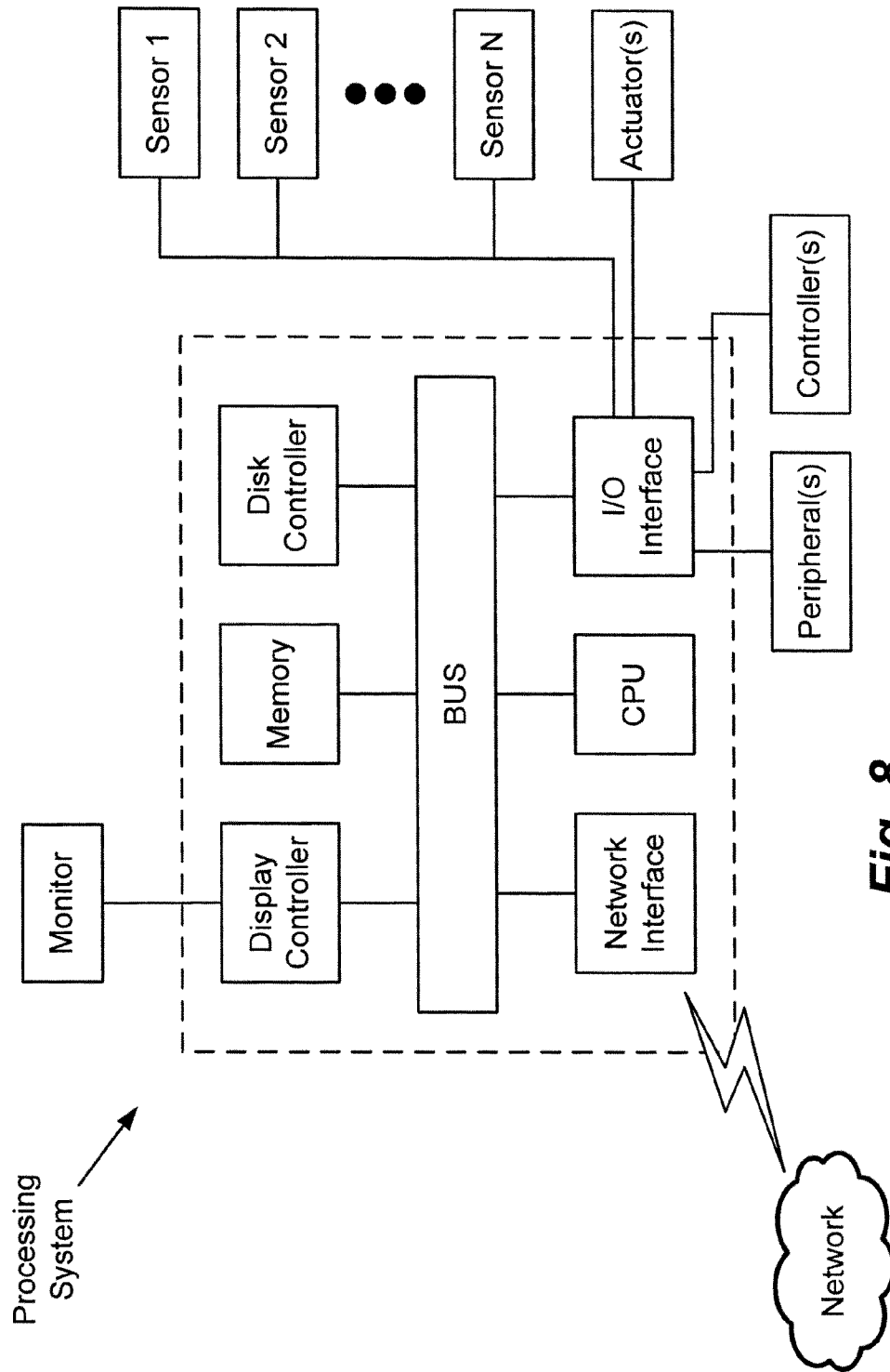
FIG. 8 schematically illustrates a processing system for a processing system, such as a controller and/or a computer system.

FIG. 8 illustrates an exemplary processing system (i.e., an exemplary processor or circuitry). One or more of such processing systems can be utilized in or to execute one or more algorithms, or portions thereof, or one or more architecture blocks, or portions thereof, in accordance with the descriptions provided herein. The system can be embodied and/or implemented as an electronic control unit (ECU) or a discrete computer installed in a vehicle.

The exemplary processing system can be implemented using one or more microprocessors or the equivalent, such as a central processing unit (CPU) and/or at least one application specific processor ASP (not shown). The microprocessor is circuitry that utilizes a computer readable storage medium, such as a memory circuit (e.g., ROM, EPROM, EEPROM, flash memory, static memory, DRAM, SDRAM, and their equivalents), configured to control the microprocessor to perform and/or control the processes and systems of this disclosure. Other storage mediums can be controlled via a controller, such as a disk controller, which can controls a hard disk drive or optical disk drive.

The microprocessor or aspects thereof, in alternate implementations, can include or exclusively include a logic device for augmenting or fully implementing this disclosure. Such a logic device includes, but is not limited to, an application-specific integrated circuit (ASIC), a field programmable gate array (FPGA), a generic-array of logic (GAL), and their equivalents. The microprocessor can be a separate device or a single processing mechanism. Further, this disclosure can benefit from parallel processing capabilities of a multi-cored CPU. Control circuitry provided by one or more processors in a multi-processing arrangement may also be employed to execute sequences of instructions contained in memory. Alternatively, hard-wired circuitry may be used in place of or in combination with software instructions. Thus, the exemplary implementations discussed herein are not limited to any specific combination of hardware circuitry and software.

In another aspect, results of processing in accordance with this disclosure can be displayed via a display controller to a monitor. The display controller preferably includes at least one graphic processing unit, which can be provided by a plurality of graphics processing cores, for improved computational efficiency. The display controller or portions thereof can also be incorporated into the CPU. Additionally, an I/O (input/output) interface is provided for inputting signals and/or data from a microphone, speakers, cameras, a mouse, a keyboard, a touch-based display or pad interface, etc., which can be connected to the I/O interface as a peripheral. For example, a keyboard or a pointing device for controlling parameters of the various processes or algorithms of this disclosure can be connected to the I/O interface to provide additional functionality and configuration options, or control display characteristics. Moreover, the monitor can be provided with a touch-sensitive or gesture-detecting interface for providing a command/instruction interface.

In an exemplary implementation, the I/O interface is provided for inputting sensor data from Sensors 1, 2 . . . N. The sensors can include battery voltage sensors, temperature sensors, current sensors, or sensors that can detect opening or closing of a switch. Other sensors that input data to the I/O interface may include velocity sensors, acceleration sensors, steering sensors, gyroscope sensors, and the like. In addition, the I/O interface is provided for inputting data from one or more controllers that enable a user to control the configuration of the wireless power transfer system. For example, the user can use the controller to set up charging operations to charge the additional battery pack 116 for an extended range trip. The I/O interface can also provide an interface for outputting control signals to one or more actuators to control various actuated components, including RF converter circuits and other circuitry in the wireless modular power transfer system. In some implementations, the actuators send control signals to align transmitter and receiver antennas of the RF converter circuits to provide coupling at a desired frequency for wireless power transfer. In addition, the actuators can send control signals to align the RF converter circuits as either transmitters or receivers.

The I/O interface can also be connected to a mobile device, such as a smartphone and/or a portable storage device. The I/O interface can include a Universal Serial Bus (USB) hub, Bluetooth circuitry, Near Field Communication (NFC) circuitry, or other wired or wireless communication circuits. In some aspects, the mobile device can provide sensor input, navigation input, and/or network access.

The above-noted components can be coupled to a network, such as the Internet or a local intranet, via a network interface for the transmission or reception of data, including controllable parameters. The network interface can include one or more IEEE 802 compliant circuits. A central BUS is provided to connect the above hardware components/circuits together and provides at least one path for digital communication there between.

The processing system may be a networked desktop computer, terminal, or personal device, such as a tablet computer or a mobile phone. The database discussed above may be stored remotely on a server, and the server may include components similar to or the same as the processing system. These devices may communicate via the network.

Suitable software, such as an operating system or an application, can be tangibly stored on a computer readable medium of a processing system, including the memory and storage devices. Other examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other medium from which a computer can read. The software may include, but is not limited to, device drivers, operating systems, development tools, applications software, and/or a graphical user interface.

Computer code elements on the above-noted medium may be any interpretable or executable code mechanism, including but not limited to scripts, interpretable programs, dynamic link libraries (DLLs), Java classes, and complete executable programs. Moreover, parts of the processing of aspects of this disclosure may be distributed for better performance, reliability and/or cost.

The procedures and routines described herein can be embodied as a device, system, method, or computer program product, and can be executed via one or more dedicated circuits or programmed processors. Accordingly, the descriptions provided herein may take the form of exclusively hardware, exclusively software executed on hardware (including firmware, resident software, micro-code, etc.), or through a combination of dedicated hardware components and general processors that are configured by specific algorithms and process codes. Hardware components are referred to as a "circuit," "module," "unit," "device," or "system." Executable code that is executed by hardware is embodied on a tangible memory device, such as a computer program product. Examples include CDs, DVDs, flash drives, hard disk units, ROMs, RAMs, and other memory devices.

Reference has been made to flowchart illustrations and block diagrams of methods, systems and computer program products according to implementations of this disclosure. Aspects thereof are implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, an implementation may be performed on modules or hardware not identical to those described. Accordingly, other implementations are within the scope that may be claimed.

The invention claimed is:

1. A system, comprising:
a plurality of electric power modules configured to provide power to one or more electrical loads having a plurality of voltage and power characteristics;
RF converter circuitry within the plurality of electric power modules that meets voltage and power characteristics of each of the plurality of electric power modules; and
control circuitry configured to:
determine a wireless power transfer path between two or more of the plurality of electric power modules based on sensor data received from the plurality of electric power modules,
configure first RF converter circuitry of a first electric power module of the plurality of electric power modules as a transmitter;
establish the first electric power module as a power source for a wireless power transfer area connecting the plurality of electric power modules based on the wireless power transfer path,
configure second RF converter circuitry of a second electric power module of the plurality of electric power modules as a receiver to establish the second electric power module as an electrical load in the wireless power transfer path,
configure a second power transfer path in parallel with the wireless power transfer area between two or more of the plurality of electric power modules via a bi-directional voltage converter connecting the two or more of the plurality of electric power modules, and
control power transfer between the plurality of electric power modules through the wireless power transfer area or the bi-directional voltage converter.

2. The system of claim 1, wherein the control circuitry is further configured to establish parallel paths of the power transfer between the plurality of electric power modules.

3. The system of claim 1, wherein the control circuitry is further configured to maintain continuity of power to electric components of a vehicle when at least one of the plurality of electric power modules is in a degraded condition.

4. The system of claim 1, wherein the plurality of electric power modules include one or more battery cells.

5. The system of claim 4, wherein the control circuitry is further configured to control warm-up the one or more battery cells.

6. The system of claim 5, wherein the warm-up of the one or more battery cells includes circulating wireless reactive power between the plurality of electric power modules via the wireless power transfer area at a predetermined frequency.

7. The system of claim 6, wherein the predetermined frequency of the wireless reactive power that is circulated between the plurality of electric power modules is determined to be a frequency at which impedance within the battery cell is at an approximate minimum.

8. The system of claim 4, wherein the plurality of electric power modules include photovoltaic cells, super capacitors, or fuel cells.

9. The system of claim 8, wherein the plurality of electric power modules include an AC/DC converter for battery charging from an AC outlet.

10. The system of claim 9, wherein the plurality of electric power modules provide electric power to one or more electric components of a vehicle.

11. The system of claim 9, wherein the control circuitry is further configured to control the wireless power transfer during the battery charging from the AC outlet with the AC/DC converter.

12. The system of claim 1, wherein the plurality of electric power modules can operate as either the power sources or the electrical loads.

13. The system of claim 1, wherein the RF converter circuitry within the plurality of electric power modules operates lei-directionally as either the transmitter or the receiver.

14. The system of claim 13, wherein the RF converter circuitry is connected in series or parallel to match the voltage and power characteristics of one or more of the plurality of electric power modules that are unequal to the voltage and power characteristics of the RF converter circuitry.

15. The system of claim 1, wherein the control circuitry is further configured to control the wireless power transfer to maintain state of charge of battery cells within the plurality of electric power modules.

16. The system of claim 1, wherein the control circuitry is further configured to detect that at least one of the plurality of electric power modules is in a degraded condition based on the sensor data received from the plurality of electric power modules or a detected loss of power to one or more electric loads supplied by the at least one of the plurality of electric power modules.

17. The system of claim 16, wherein the control circuitry is further configured to modify the wireless power transfer path between the plurality of electric power modules in response to detecting that the at least one of the plurality of electric power modules is in a degraded condition.

18. A method, comprising:
  determining a wireless power transfer path between two or more of a plurality of electric power modules based on sensor data received from the plurality of electric power modules;
  configuring at least one first RF converter circuit of at least one first electric power module as a transmitter;
  establishing the at least one first RF converter circuit as a power source for a wireless power transfer area connecting the plurality of electric power modules based on the wireless power transfer path;
  configuring at least one second RF converter circuit of at least one second electric power module as a receiver to establish the at least one second electric power module as an electrical load in the wireless power transfer path;
  configuring a second power transfer path in parallel with the wireless power transfer area between two or more of the plurality of electric power modules via a bi-directional voltage converter connecting the two or more of the plurality of electric power modules; and
  controlling power transfer between the plurality of electric power modules through the wireless power transfer area or the bi-directional voltage converter.

19. A non-transitory computer-readable storage medium including executable instructions, which when executed by circuitry, causes the circuitry to perform the method according to claim 18.

20. A system, comprising control circuitry configured to:
  determine a wireless power transfer path between two or more of a plurality of electric power modules based, on sensor data received from the plurality of electric power modules,
  configure first RF converter circuitry of a first electric power module of the plurality of electric power modules as a transmitter;
  establish the first electric power module as a power source for a wireless power transfer area connecting the plurality of electric power modules based on the wireless power transfer path,
  configure second RF converter circuitry of a second electric power module of the plurality of electric power modules as a receiver to establish the second electric power module as an electrical load in the wireless power transfer path,
  configure a second power transfer path in parallel with the wireless power transfer area between two or more of the plurality of electric power modules via a bi-directional voltage converter connecting the two or more of the plurality of electric power modules, and
  control power transfer between the plurality of electric power modules through the wireless power transfer area or the bi-directional voltage converter.

* * * * *